United States Patent
Fogg

(10) Patent No.: US 9,336,639 B2
(45) Date of Patent: May 10, 2016

(54) RADIO FREQUENCY IDENTIFICATION TAGGING

(75) Inventor: Martin Fogg, Bicester (GB)

(73) Assignee: ZIH CORP., Lincolnshire, IL (US)

( * ) Notice: Subject to any disclaimer, the term of this patent is extended or adjusted under 35 U.S.C. 154(b) by 3066 days.

(21) Appl. No.: 10/597,195

(22) PCT Filed: Jan. 13, 2005

(86) PCT No.: PCT/GB2005/050007
§ 371 (c)(1),
(2), (4) Date: Aug. 7, 2008

(87) PCT Pub. No.: WO2005/069208
PCT Pub. Date: Jul. 28, 2005

(65) Prior Publication Data
US 2009/0009288 A1    Jan. 8, 2009

(30) Foreign Application Priority Data

Jan. 15, 2004  (GB) .................................. 0400834.8

(51) Int. Cl.
*H04Q 5/22* (2006.01)
*G08B 13/14* (2006.01)
(Continued)

(52) U.S. Cl.
CPC .......... *G07D 7/0093* (2013.01); *G06K 19/0704* (2013.01); *G06K 19/0723* (2013.01); *G06K 19/07345* (2013.01); *G06K 19/07758* (2013.01); *G07D 7/12* (2013.01)

(58) Field of Classification Search
CPC ..................... G06K 19/0704; G06K 19/07345; G06K 19/07749; G06K 19/07762; G06K 19/0723; G07D 7/0093; G07D 7/12; G08B 13/2417; G08B 13/2431

USPC ................ 340/10.1, 5.86, 10.51, 10.52, 572, 340/572.1, 825.26, 825.27, 7.48, 7.52, 5.4, 340/5.41, 5.42, 10.2, 10.3, 10.32, 572.2, 340/572.4, 10.4, 10.42, 10.41, 539.13, 340/870.11, 825.73, 7.21, 505, 825.54, 340/825.34, 825.31, 825.49, 825.69, 340/825.72, 572.7; 235/379, 380, 487, 492; 705/39, 41, 64

See application file for complete search history.

(56) References Cited

U.S. PATENT DOCUMENTS

| | | | | | |
|---|---|---|---|---|---|
| 5,874,724 | A | * | 2/1999 | Cato | G06K 7/10079 235/382 |
| 6,104,281 | A | * | 8/2000 | Heinrich | G08B 13/1409 116/137 A |

(Continued)

FOREIGN PATENT DOCUMENTS

| | | |
|---|---|---|
| DE | 4311385 A1 | 10/1994 |
| EP | 1047015 A2 | 10/2000 |
| FR | 2770316 A1 | 4/1999 |

OTHER PUBLICATIONS

International Search Report for InternationalApplication No. PCT/GB2005/050007, completed on Apr. 8, 2005.

*Primary Examiner* — Mirza Alam

(57) ABSTRACT

A Radio Frequency Identification (RFID) tag has an electronic identification circuit coupled to an antenna, wherein the RFID tag is arranged to communicate with a RFID tag reader via the antenna, using RF energy. The tag comprises means sensitive to light (such as a photodiode, phototransistor, photocell or a solar cell) for controlling (in particular inhibiting) communication between the RFID tag reader and the RFm tag. The tag can for example be embedded in or on a high-value object such as a banknote. The existence of the banknote cannot be detected e.g. by criminals in the absence of light (e.g. while the banknote is located in a wallet), but the authenticity of the banknote can be verified in legitimate use.

20 Claims, 2 Drawing Sheets

(51) Int. Cl.
*G05B 23/00* (2006.01)
*G06K 19/06* (2006.01)
*G07D 7/00* (2016.01)
*G06K 19/07* (2006.01)
*G06K 19/073* (2006.01)
*G06K 19/077* (2006.01)
*G07D 7/12* (2016.01)

(56) References Cited

U.S. PATENT DOCUMENTS 7,002,474 B2  2/2006  De Souza et al.

2002/0005774 A1* 1/2002 Rudolph ............... G06F 21/35
                                             340/5.61
2003/0173408 A1* 9/2003 Mosher, Jr. ........... A61B 5/117
                                             235/492
2004/0000987 A1* 1/2004 De Souza et al. ............ 340/5.8
2004/0012496 A1* 1/2004 De Souza ........... G06K 19/0723
                                             340/572.3
2004/0233040 A1* 11/2004 Lane .................... G06K 19/025
                                             340/5.86
2006/0065714 A1* 3/2006 Jesme ................. G06K 7/10336
                                             235/380
2006/0115797 A1* 6/2006 Gray ............................ 434/110

* cited by examiner

RADIO FREQUENCY IDENTIFICATION TAGGING

BACKGROUND OF THE INVENTION

1. Field of the Invention

The present invention relates to a Radio Frequency Identification (RFID) tag and a use of such a RFID tag.

2. Description of Related Art

RFID tags are currently in widespread use, inter alia as security features. There are proposals to equip banknotes, credit cards, debit cards, store loyalty cards and other high-value objects with RFID tags in an attempt to prevent fraud.

The present inventor has appreciated that there may be privacy and security concerns if the objects listed above (in the following referred to as high-value objects) are equipped with a RFID tag. For example, whilst embedding a RFID tag in a banknote would enable the identity and authenticity of the banknote to be verified by a suitable RFID reader, it might also enable a criminal who is in the possession of a suitable RFID reader to detect whether a particular person is carrying a large amount of money. This would, of course, be undesirable.

The present invention has been made to address this concern.

Aspects of the present invention are set out in the independent claims.

In one aspect the present invention provides a Radio Frequency Identification (RFID) tag comprising:

an electronic identification circuit coupled to an antenna, wherein the RFID tag is arranged to communicate with a RFID tag reader via said antenna, using RF energy, and means sensitive to light for inhibiting communication between the RFID tag reader and the RFID tag.

The means sensitive to light (for example a photodiode, a phototransistor, a photocell or a solar cell) can ensure that the RFID tag can only be read when exposed to (sufficient) light, for example ambient light. Conversely, when the RFID tag is not exposed to (sufficient) light, e.g. if the tag is embedded in a banknote and the banknote is placed in a wallet, the RFID tag cannot be read by a RFID reader.

The electronic identification circuit may be powered by RF energy received via the antenna, or alternatively it may be powered by a source of energy other than the antenna, for example a battery. Preferably, the means sensitive to light is arranged to reduce the range over which said RFID tag can transmit information to said reader in the absence of light of more than a predetermined threshold. Such an arrangement can be of use if it is desired to enable legitimate use of a high-value object despite the absence of light when the high-value object is brought into close proximity to a RFID tag reader. For example, it may be desirable for a credit card carrying the tag to be used for payment even if the credit card remains in a wallet. The tag could be configured such that it can be read (even in the absence of light) over a distance of a few millimeters or centimeters. Detection of the credit card by criminals could still be prevented as they are less likely to be able to bring a RFID tag reader into such close proximity to a potential victim's wallet.

BRIEF SUMMARY OF THE INVENTION

In a second aspect, and as an inventive extension of the first aspect, the present invention provides a Radio Frequency Identification (RFID) tag comprising:

an electronic identification circuit coupled to an antenna, wherein the RFID tag is arranged to communicate with a RFID tag reader via said antenna, using RF energy, and means sensitive to light for controlling communication between the RFID tag reader and the RFID tag.

The inventor has recognised that the means sensitive to light can influence the operation of the RFID tag in various ways. For example, the means sensitive to light could solely, mainly or partly be responsible for supplying the energy necessary for communication between the RFID tag and the RFID tag reader.

Preferably, the electronic identification circuit is powered by energy received from the means sensitive to light when the means sensitive to light is exposed to substantially continuous, ambient light, for example normal daylight or room lighting.

BRIEF DESCRIPTION OF THE SEVERAL VIEWS OF THE DRAWING(S)

Some preferred embodiments of the invention will now be described by way of example only and with reference to the accompanying drawings, in which.

DETAILED DESCRIPTION OF THE INVENTION

Figure 1:
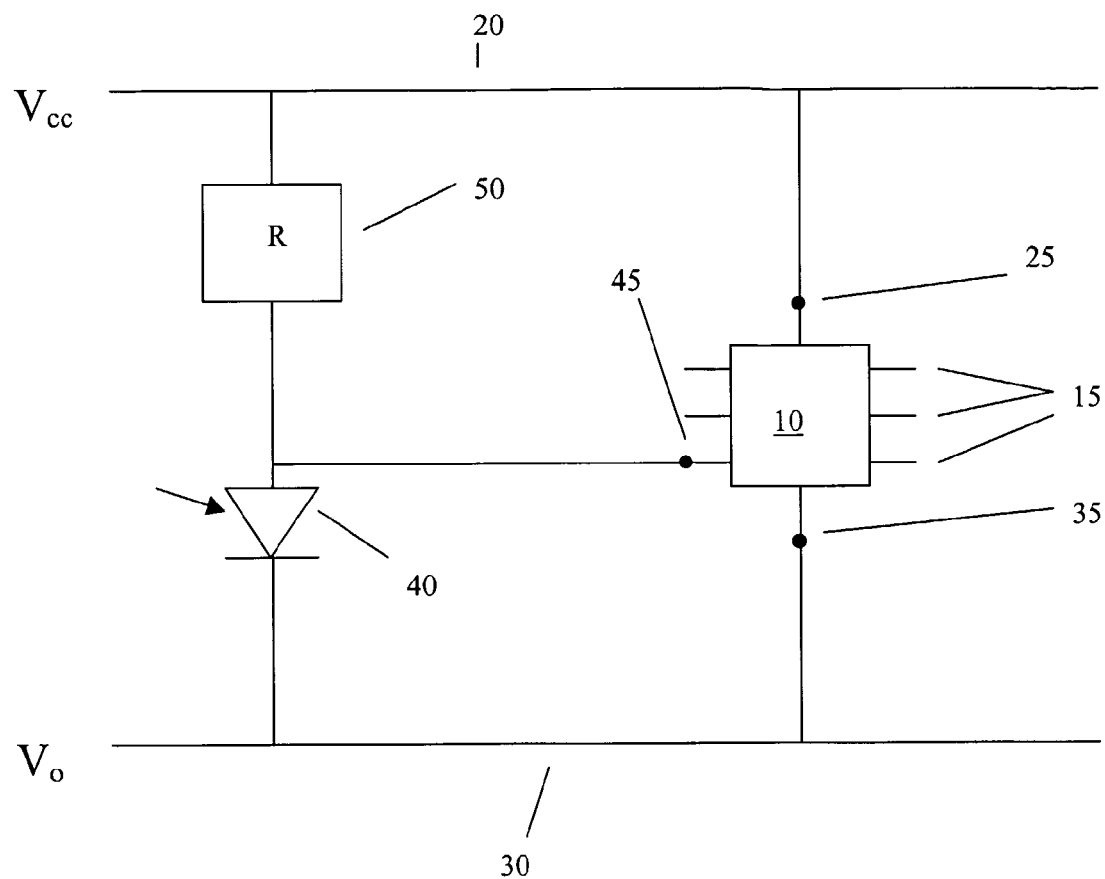
FIG. 1 shows a simplified circuit diagram of a RFID tag according to a first embodiment of the present invention.

FIG. 1 shows an electronic identification circuit 10 having (in the example shown eight) pin connectors 15. Two of these are connected at points 25 and 35 respectively to a power source (not shown) generating a voltage $V_{CC}$-$V_0$ between lines 20 and 30. Line 20 is connected to line 30 via resistor 50 arranged in series with light sensitive element 40. The potential between resistor 50 and light sensitive element 40 is applied to one of the pin connectors 15 at point 45. The other connections of pin connectors 15 are not shown. At least one antenna (shown only in FIG. 2 at 11 and 12) is coupled to the electronic identification circuit 10 for communicating with a RFID tag reader using RF energy.

Instead of a separate power source, the antenna (driven by RF energy received from the tag reader) may be used to provide power for the RFID tag. The tag could also have two antennas, one for communication with the tag reader and one for providing power for the tag.

The electronic identification circuit 10 is set up such that communication with a RFID tag reader is disabled if the potential at point 45 is sufficiently close to $V_{CC}$. If the potential at point 45 is close to $V_0$ then the electronic identification circuit 10 is enabled for communication with the RFID tag reader.

The light sensitive element 40 can for example be selected from a photodiode, a phototransistor, a photocell or a solar cell. The connection shown in FIG. 1 is particularly suitable for a photodiode, but other light sensitive elements can be used, and any necessary modifications to the circuit diagram will be clear to one skilled in the art enlightened by the present disclosure. For the purpose of the following description of the first embodiment it will be assumed that the light sensitive element 40 comprises a photodiode.

In operation, in the absence of light the resistance of photodiode 40 will be much larger than in the presence of light.

Assuming that suitable resistance values are chosen for the resistor 50 (which could be a standard ohmic resistor), the resistance of the photodiode 40 will be much lower than the resistance of the resistor 50 in the presence of light, and the resistance of the photodiode 40 will be much larger than the resistance of the resistor 50 in the absence of light. This means that in the presence of light the potential at point 45 is close to $V_0$, whereas in the absence of light it will be close to $V_{CC}$. The electronic identification circuit 10 is configured such that a potential close to $V_{CC}$ at point 45 will disable the circuit as regards communication with the tag reader. The signal on point 45 can hence be considered as a disabling signal.

As an alternative, the position of photodiode 40 and resistor 50 could be swapped and the circuit 10 set up such that it can only communicate with the tag reader if the potential at point 45 is close to $V_{CC}$.

Figure 2:
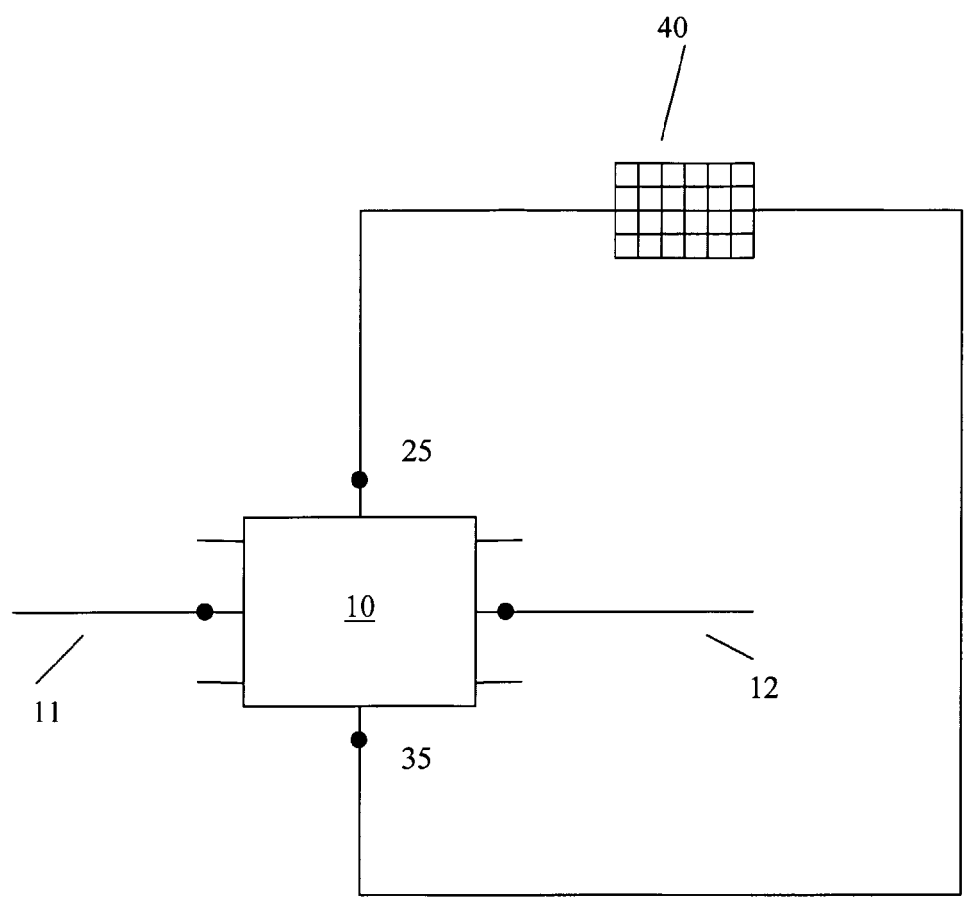
FIG. 2 shows a simplified circuit diagram of a RFID tag according to a second embodiment of the present invention.

FIG. 2 shows a second embodiment comprising an electronic identification circuit 10 coupled to an antenna 11, 12 and connected at points 25 and 35 to a solar cell 40 (as a representative example of a light sensitive element). The solar cell 40 powers the circuit 10, which means that in the absence of light (assuming the circuit 10 is not powered by other means) the circuit is disabled, i.e. cannot communicate with a RFID tag reader. A diode and/or rectifier (not shown) may be required in the connection between the solar cell 40 and the electronic identification circuit 10. The diode and/or rectifier can be integrated into the circuit 10.

Whilst the light sensitive element 40 of the first embodiment merely has the function of generating a disabling/enabling signal, the light sensitive element 40 of the second embodiment has to provide the power for the RFID tag.

As a third embodiment (a modification of the second embodiment), the electronic identification circuit 10 can be set up such that the RF energy received by the antenna 11, 12 from a suitable RFID tag reader is used to power the circuit 10, i.e. to provide the energy necessary for re-transmitting a signal back to the RFID tag reader. This could for example be sufficient to enable the tag to be read over a distance of a few millimeters or centimeters. Since the circuit is also powered by solar cell 40 the range over which the tag can be read is increased in the presence of light.

The arrangement shown in FIG. 2 is suitable for use in the third embodiment. However, as compared with the second embodiment, additional diodes and/or rectifiers (not shown) may need to be used to connect the solar cell and the antenna to the identification circuit so as to ensure that both can be used to power the RFID tag. Again, these diodes and/or rectifiers can be integrated into the circuit 10. It will be clear to one of ordinary skill in the art how any such diodes and/or rectifiers would need to be connected.

According to the first and second embodiments, in the absence of light the tag cannot be read by a RFID tag reader at all. By way of contrast, according to the third embodiment the RFID tag can be read at all times, but the range over which the tag can be read is increased in the presence of light.

Figure 3:
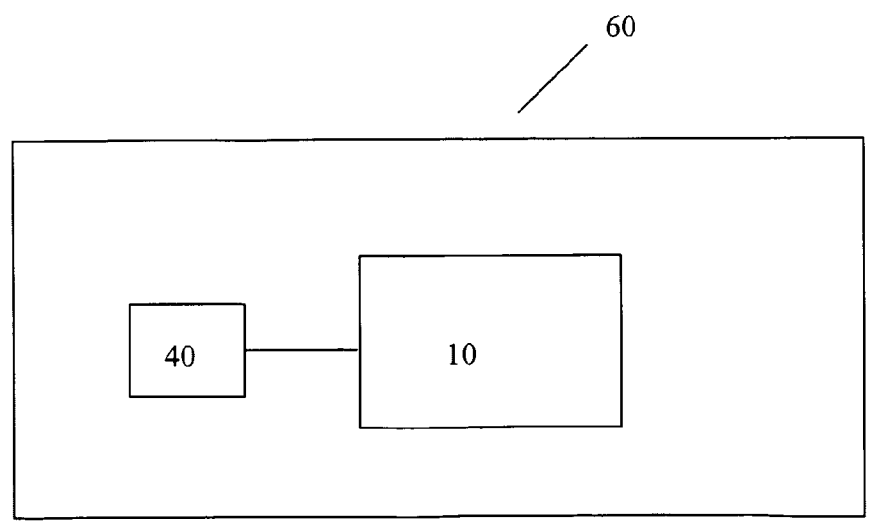
FIG. 3 shows a use of a tag according to the present invention.

FIG. 3 shows schematically an example of application for the above described technique. Shown in FIG. 3 is a high value object 60 (such as a credit card, debit card, store loyalty card or banknote) in which or on which is arranged a tag according to the first, second or third embodiment. This tag is schematically shown as RFID identification circuit 10 connected to light sensitive element 40. Other details have been omitted for simplicity.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A Radio Frequency Identification (RFID) tag comprising:
an electronic identification circuit coupled to an antenna, wherein the RFID tag is configured to communicate with a RFID tag reader via said antenna, using RF energy, and
a light sensitive communication component configured to control a communications range between the RFID tag reader and the RFID tag, the communications range is larger when the light sensitive component detects light as compared to when the light sensitive component detects an absence of light, and wherein the RFID tag is configured to communicate information regardless of whether the light sensitive component detects light.

2. The RFID tag according to claim 1, wherein the RF energy is received via said antenna or via a further antenna.

3. The RFID tag according to claim 1, wherein the electronic identification circuit is at least partially powered by a source of energy other than said antenna.

4. The RFID tag according to claim 1, wherein the light sensitive component is configured substantially prevent information from being transmitted from said RFID tag to said reader in the absence of the light of more than a predetermined threshold.

5. The RFID tag according to claim 1, wherein the light sensitive component is selected from one of a photodiode, a phototransistor, a photocell or a solar cell.

6. The RFID tag according to claim 1, wherein the RFID tag is included in an object.

7. The RFID tag according to claim 6, wherein the object is selected from a banknote and a credit card.

8. A Radio Frequency Identification (RFID) tag comprising:
an electronic identification circuit coupled to an antenna, wherein the RFID tag is configured to communicate with a RFID tag reader via said antenna, using RF energy, and the electronic identification circuit includes a light sensitive component configured to control a communications range within which the RFID tag is configured to communicate with the RFID tag reader, the communications range is larger when the light sensitive component detects light as compared to when the light sensitive component detects an absence of light, and wherein the RFID tag is configured to communicate information regardless of whether the light sensitive component detects light.

9. The RFID tag according to claim 8, wherein when the light sensitive component detects light, the electronic identification circuit is at least partially powered by the light received from said light sensitive component.

10. The RFID tag according to claim 1, wherein the light sensitive component is configured to be sensitive to visible light irrespective of frequency within the visible light spectrum.

11. The RFID tag according to claim 1, wherein the RF energy is received by the antenna and is used to at least partially drive communications between the RFID tag and the RFID tag reader.

12. The RFID tag according to claim 8, wherein the RF energy is received by the antenna and is used to at least partially drive communications between the RFID tag and the RFID tag reader.

13. The RFID tag according to claim 8, wherein:
said antenna is coupled to a first pin of said electronic identification circuit, and
said light sensitive component is coupled to a second pin of said electronic identification circuit, wherein said first pin and said second pin are different.

14. The RFID tag according to claim 8, wherein said light sensitive component includes at least one of a photodiode, phototransistor, photocell and solar cell.

15. A method of using an RFID system, comprising:
providing RF energy;
receiving the RF energy by an RFID tag; and
in response to the RFID tag receiving the RF energy, communicating information between the RFID tag and a RFID tag reader, wherein communicating the information occurs within a communications range, the communications range is larger when a light sensitive component detects light as compared to when the light sensitive component detects an absence of light.

16. The method according to claim 15 further comprising receiving light at the light sensitive component, wherein the light sensitive component includes at least one of a photocell and solar cell.

17. The method according to claim 15 further comprising deriving power from the light received by the light sensitive component.

18. The method according to claim 17 further comprising using the power derived from the light to enable the communications range to be larger than when the light sensitive component detects the absence of light.

19. The method according to claim 15, wherein receiving the RF energy is performed by an antenna included in the RFID tag and wherein communicating the information at least partially involves the antenna.

20. The method according to claim 15 further comprising at least partially powering the RFID tag by a source of energy other than the RFID tag reader.

* * * * *